(12) United States Patent
Narendran et al.

(10) Patent No.: US 8,615,267 B1
(45) Date of Patent: *Dec. 24, 2013

(54) SELECTING POWER LEVEL FOR AN INITIAL ACCESS PROBE USING MACRO-NETWORK REVERSE LINK CONDITIONS

(75) Inventors: Rajveen Narendran, Olathe, KS (US); Andrew M. Wurtenberger, Olathe, KS (US); Ryan S. Talley, Overland Park, KS (US); Muralidhar R. Malreddy, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 356 days.

This patent is subject to a terminal disclaimer.

(21) Appl. No.: 12/984,017

(22) Filed: Jan. 4, 2011

(51) Int. Cl.
*H04W 52/16* (2009.01)
*H04W 52/24* (2009.01)

(52) U.S. Cl.
USPC .............................. 455/522; 455/69

(58) Field of Classification Search
None
See application file for complete search history.

(56) References Cited

U.S. PATENT DOCUMENTS 7,466,682 B1 * 12/2008 Ribas et al. ............... 455/453 X

* cited by examiner

*Primary Examiner* — Philip Sobutka

(57) ABSTRACT

Methods and systems are provided for considering macro-network reverse-link conditions when selecting a power level at which to send an initial access probe to a femtocell. In at least one embodiment, a mobile station receives an indication of macro-network reverse noise, and then selects an initial-access-probe transmit power level based at least in part on the value of the received indication. The mobile station then sends an initial access probe to a femtocell at the selected power level. The mobile station may receive indications of macro-network reverse noise such as a reverse noise rise (RNR), reverse frame error rate (RFER), reverse activity bits (RAB), suggested macro-network initial-access-probe transmit power levels, etc.

20 Claims, 3 Drawing Sheets

SELECTING POWER LEVEL FOR AN INITIAL ACCESS PROBE USING MACRO-NETWORK REVERSE LINK CONDITIONS

BACKGROUND

1. Macro Cellular Wireless Networks

Many people use mobile stations (e.g. cell phones and personal digital assistants (PDAs)) to communicate with macro cellular-wireless networks (i.e. wireless wide area networks (WWANs)), which typically provide communication services such as voice, text messaging, and packet-data communication. These mobile stations (i.e. access terminals) and networks typically communicate with each other over a radio-frequency (RF) air interface according to a wireless-communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a CDMA protocol known as EV-DO, which stands for "Evolution Data Optimized." EV-DO networks, operating in conformance with one or more releases and/or revisions of industry specification IS-856, both Release 0 and Revision A thereof being hereby incorporated herein by reference, provide high-rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some "hybrid" mobile stations can communicate with both 1x networks and EV-DO networks.

Mobile stations typically conduct wireless communications with these networks via one or more base transceiver stations (BTSs), each of which send communications to and receive communications from mobile stations over the air interface. Each BTS is in turn connected with a network entity known as a base station controller (BSC) (i.e. radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. As examples, an MSC may interface with the public switched telephone network (PSTN), while a PDSN may interface with one or more core packet data networks and/or the Internet. As such, mobile stations can typically communicate over the one or more signaling and/or transport networks from anywhere inside the coverage area of one or more BTSs, via the BTS(s), a BSC, and a switch or gateway such as an MSC and/or PDSN.

The base stations (i.e. BTSs or combinations of (1) one or more BTSs and (2) a BSC) for these macro cellular networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as macro (or macro-network) base stations, and the network they collectively form—or to which they collectively belong—is referred to generally and herein as the macro network. And the BTSs associated with macro networks may be referred to herein as macro BTSs (or just BTSs).

Mobile stations and macro base stations conduct communication sessions (e.g. voice calls and data sessions) over frequencies known as carriers (i.e. macro carriers), each of which may actually be a pair of frequencies, with the base station transmitting to the mobile station on one of the frequencies, and the mobile station transmitting to the base station on the other. This approach is known as frequency division duplex (FDD). And the base-station-to-mobile-station link is known as the forward link, while the mobile-station-to-base-station link is known as the reverse link. Note that an instance of a carrier in a macro coverage area referred to as a sector may be known and referred to herein as a sector-carrier or macro sector-carrier.

When a mobile station seeks to originate a communication session (e.g. a voice call) with, or respond to a page message from, a base station such as a macro network base station or a smaller base station known as a femtocell (described more fully below), the mobile station sends one or more messages known as access probes to the base station over a reverse-link access channel. Typically, the mobile station will send an initial access probe at a default power level, and then send successive access probes at increased power levels until acknowledged by the base station.

2. Reverse-Link Conditions

At a given moment, the sum total of what a macro base station is receiving on a given sector-carrier is known as the reverse noise on that sector-carrier. A macro base station, along with or in addition to other macro-network entities, may detect and track reverse noise on the macro network. A macro base station may also broadcast (to mobile stations) messages that include information on reverse noise conditions. For instance, a macro base station may suggest a power level for mobile stations to use for transmissions on the reverse link of the macro network, such that the suggested power level is appropriate in the face of the current reverse noise conditions of the macro network.

a. Reverse Noise Rise

At regular intervals, and in fact quite frequently (e.g., once for every forward-link timeslot (i.e. once every approximately 1.67 ms)), macro base stations compute reverse noise rise (RNR), which is the difference between (i) the reverse noise that the macro base station is currently detecting and (ii) a baseline level of reverse noise. Thus, the macro base station computes how far the reverse noise has risen above that baseline.

To determine the baseline, EV-DO networks, as one example, typically periodically utilize what is known as a silent interval, which may occur on the order of once every five minutes, and last on the order of 40-100 ms, both of which are typically configurable. During the silent interval, mobile stations know not to transmit anything to the macro base station. The macro base station can then measure whatever else is out there. As such, the baseline corresponds to the amount of reverse noise when the sector-carrier is unloaded (i.e. without any transmitting mobile stations). And other reverse-link-noise levels, such as 24-hour or other minimums, could be used as a baseline.

In general, the lower the RNR is at a given moment, the more favorable the RF conditions are for communication between mobile stations and a macro base station at that moment. Correspondingly, the higher the RNR, the less favorable the RF conditions are. Moreover, a low RNR generally corresponds to a sector-carrier being lightly loaded, in other words that is supporting communications for a relatively low number of mobile stations. A high RNR, as one might expect, generally corresponds to a sector-carrier being heavily loaded, in other words that is supporting communications for a relatively high number of mobile stations. A macro base station may include the RNR in signaling messages sent to mobile stations.

b. Reverse Activity Bit (RAB)

In EV-DO networks, macro base stations typically use the calculated value of RNR to, among other things, set or clear what is known as the Reverse Activity Bit (RAB), which is a value that the macro base station makes equal to 0 or 1, and repeatedly transmits to all the mobile stations operating on a given sector-carrier. Note that making the RAB equal to 0 is known as "clearing" the RAB, while making the RAB equal to 1 is known as "setting" the RAB. As stated, the macro base station typically calculates RNR at the same frequency at which it transmits forward-link timeslots, or once every 1.67 ms. The macro base station typically sets or clears the RAB at this same frequency.

With respect to how the macro base station chooses whether to set or clear the RAB, if the RNR is above a threshold ("RNR threshold" or "RAB threshold"), which is a configurable parameter that may be between 0 dB and 30 dB, the macro base station sets the RAB. If the RNR is below the RNR threshold, the macro base station clears the RAB. The macro base station transmits the RAB in a TDM channel—known as the reverse-activity channel—on the forward link. That channel is itself a TDM portion of a forward-link channel known as the Media Access Control (MAC) channel.

c. Reverse-Link Frame Error Rate (RFER)

The reverse-link frame error rate (RFER) is another mechanism by which macro base stations can detect and track reverse noise. Using 1× networks by example, data is transmitted on the air interface in units known as frames, which typically last 20 ms. Some reverse-link frames received by the macro base station contain no errors, while some frames do contain errors as a result of imperfect transfer from the mobile station, and some are not received at all. The RFER, then, is a ratio, computed per mobile station by the macro base station over a given time period of (i) the number of error-containing and missing frames from each mobile station to (ii) the total number of frames that the macro base station should receive from that respective mobile station. Other things being more or less equal, the more power the mobile station uses to transmit to the base station, the lower the mobile station's RFER will be.

At approximately the same frequency at which the macro base station is receiving reverse-link frames (i.e., once every 20 ms) from a mobile station, the macro base station computes a RFER for that mobile station over some previous number of frames, e.g., 20, 100, 200, etc. Thus, on a frame-by-frame basis, the macro base station computes a RFER for some rolling window of previous frames.

3. Femtocells

Many macro-network subscribers, including private consumers and small businesses, among others, in addition to having wireless service (which may include data service) for their respective mobile stations, also have high-speed (a.k.a. broadband) Internet access through another communication channel, which may be cable-modem service, digital-subscriber-line (DSL) service, satellite-based Internet service, and/or some other option or combination thereof.

In a typical arrangement, a user may have a cable modem connected (a) via coaxial cable to a cable provider's network and (b) via Ethernet cable to a wireless (e.g. IEEE 802.11 (Wi-Fi)) router. That router may include one or more Ethernet ports to which computers or other devices may be connected, and may also include wireless-access-point functionality, providing a wireless packet-data interface to, e.g., laptop computers, digital video recorders (DVRs), appliances, and/or any other computing devices or their respective wireless network adapters.

To address gaps in macro-network coverage (e.g. in buildings) and for other reasons, macro-network service providers offer consumers devices referred to herein as femtocells, which may also be referred to as femto base stations, femto BTSs, picocells, pico base stations, pico BTSs, microcells, micro base stations, micro BTSs, and by other names, such as Internet base stations or perhaps low-cost Internet base stations (LCIBs). Note that the aforementioned terms that end in "cell" may also be used generally and herein to refer to the coverage area provided by the respective device. And with respect to the term LCIB, low-cost is not used as a limiting term; that is, devices of any monetary cost may be categorized as LCIBs, though most LCIBs typically will be less expensive on average than most macro-network base stations.

A femtocell may be approximately the size of a desktop phone or Wi-Fi access point, and is essentially a low-power, low-capacity version of a macro base station. Thus, a femtocell may use a power outlet, perhaps with a transformer providing a DC power supply. The femtocell may have a wired (e.g. Ethernet) or wireless (e.g. Wi-Fi) connection with the user's router, and would thus have connectivity to the Internet and/or one or more other packet-data networks via that broadband connection. A femtocell may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

A typical femtocell also has a wireless-communication interface (operating according to, CDMA, EV-DO, and/or one or more other protocols) that is compatible with the user's mobile station(s), such that the femtocell may act as a micro base station, providing coverage for the mobile station(s) on the macro-network provider's network via the user's Internet connection. Usually, a femtocell provides service on a single RF carrier (or on a single carrier per protocol, if multiple protocols (e.g. CDMA and EV-DO) are supported), and transmits what is known as and referred to herein as a pilot beacon, which is a radio beacon that includes overhead messages and parameters that mobile stations use to connect with (i.e. handoff to) the femtocell.

Overview

A femtocell may experience reverse noise similar to that experienced by surrounding macro base stations, perhaps if the femtocell and a nearby macro base station operate on a common carrier frequency (or more than one common carrier frequencies) or perhaps if the femtocell and the macro base station are embedded within similar environmental conditions that create noise. When a femtocell is experiencing reverse noise, there may be a high failure rate for (at least initial) access probes sent from mobile stations to that femtocell. For instance, the default power level at which such an access probe is initially transmitted may be insufficient to overcome the reverse noise on the carrier frequency of the femtocell. A mobile station may disadvantageously need to send multiple access probes at increasing power levels to establish contact with the femtocell, or may not succeed in contacting the femtocell.

Methods and systems are provided for considering macro-network reverse-link conditions when selecting a power level at which to send an initial access probe to a femtocell. A mobile station receives an indication of macro-network reverse noise; selects (e.g. computes) an initial-access-probe transmit power level based at least in part on that received indication; and sends an initial access probe at the selected power level. The mobile station may receive indications of macro-network reverse noise such as a reverse noise rise (RNR), reverse frame error rate (RFER), reverse activity bits (RAB), or suggested macro-network initial-access-probe transmit power levels from a macro-network base station, perhaps some other option(s), or perhaps some combination thereof.

These as well as other aspects and advantages will become apparent to those of ordinary skill in the art by reading the following detailed description, with reference where appropriate to the accompanying drawings.

BRIEF DESCRIPTION OF THE DRAWINGS

Various embodiments are described herein with reference to the following drawings, wherein like numerals denote like entities.

DETAILED DESCRIPTION OF EXEMPLARY EMBODIMENTS

1. Example Architectures a. Example Communication System

Figure 1:
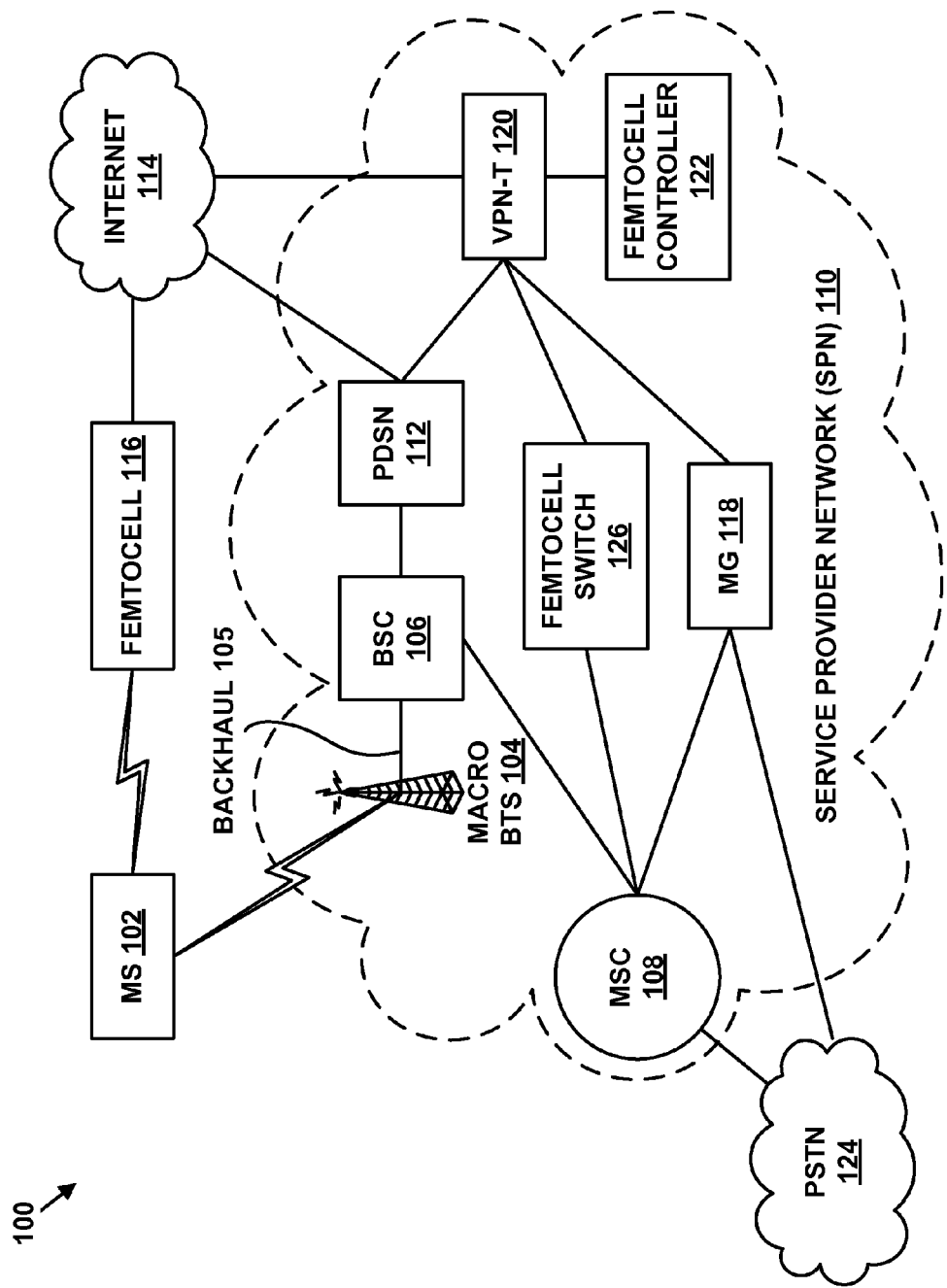
FIG. 1 depicts a communication system, in which at least one embodiment may be carried out.

FIG. 1 is a simplified block diagram of a communication system, in which at least one embodiment may be carried out. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, communication system 100 includes mobile station 102, macro BTS 104, BSC 106, MSC 108, service provider network 110, PDSN 112, Internet 114, femtocell 116, media gateway 118, VPN terminator 120, femtocell controller 122, PSTN 124, and femtocell switch 126. Additional entities could be present, such as additional mobile stations in communication with macro BTS 104, additional entities in communication with Internet 114, PSTN 124, etc. And there could be one or more devices and/or networks making up at least part of one or more communication links. As an example, there could be one or more routers, cable modems, and/or other devices or networks on the link between Internet 114 and femtocell 116.

Mobile station 102 may be any mobile device arranged to carry out the mobile-station functions described herein, and is also described in connection with FIG. 2. Mobile station 102 may include a communication interface, a processor, and data storage comprising instructions executable by the processor for carrying out those mobile-station functions. Mobile station 102 may also have a user interface including buttons, a touchscreen, a microphone, and/or any other elements for receiving inputs, as well as a speaker, one or more displays, and/or any other elements for communicating outputs.

The communication interface may include an antenna and a chipset suitable for communicating with one or more macro base stations and/or one or more femtocells over suitable air interfaces. The chipset could be suitable for CDMA communication in compliance with one or more standards such as IS-95 and IS-2000. The chipset or wireless-communication interface in general may also or instead be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any entity arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more (e.g. CDMA) coverage areas such as cells and sectors, for communicating with mobile stations such as mobile station 102 over an air interface. The communication interface may also include one or more wired (e.g. Ethernet) and/or wireless (e.g. Wi-Fi) interfaces for communicating with at least BSC 106.

BSC 106 may be any entity arranged to carry out the BSC functions described herein, and may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity.

MSC 108 may be any entity arranged to carry out the MSC functions described herein, and may include a communication interface, a processor, and data storage comprising instructions executable by the processor to carry out those MSC functions. The communication interface may include one or more wired and/or wireless interfaces for communicating with at least BSC 106, MG 118, femtocell switch 126, and PSTN 124. In general, MSC 108 acts as a switch between (a) PSTN 124 and (b)(i) one or more BSCs such as BSC 106 and (ii) one or more femtocell switches such as femtocell switch 126, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any entity arranged to carry out the PDSN functions described herein, and may include a communication interface, a processor, and data storage comprising instructions executable by the processor for carrying out those PDSN functions. The communication interface may include one or more wired and/or wireless interfaces for communicating with at least BSC 106, VPN terminator 120, and Internet 114. In general, PDSN 112 acts as a network access server between (a) Internet 114 and (b)(i) BSCs such as BSC 106 and (ii) VPN terminators such as VPN terminator 120, facilitating packet-data communication between mobile stations and Internet 114, via macro base stations and femtocells.

Internet 114 may be the well-known global packet-data network generally referred to as the Internet. However, Internet 114 may also be or include one or more other packet-data networks. As such, Internet 114 may include one or more wide area networks, one or more local area networks, one or more public networks, one or more private networks, one or more wired networks, one or more wireless networks, and/or one or more other networks. Devices in communication with Internet 114 may exchange data using a packet-switched protocol such as the Internet Protocol (IP), and may be identified by an address such as an IP address.

Femtocell 116 may be any computing and communication device arranged to carry out the femtocell functions described herein, and may include a communication interface, a processor, and data storage comprising instructions executable by the processor for carrying out those femtocell functions. The communication interface may include (a) a wireless interface for communicating with one or more mobile stations according to a protocol such as CDMA (and/or one or more other protocols) and (b) an Ethernet or Wi-Fi interface for communicating with a device such as a router and/or a cable modem.

Media gateway 118 may be any entity arranged to carry out the media-gateway functions described herein, and may include a communication interface, a processor, and data storage comprising instructions executable by the processor for carrying out those media-gateway functions. The communication interface may include a circuit-switched interface and a packet-switched interface. Media gateway 118 may (a) receive packet-based communications from SPN 110, convert those to circuit-switched communications, and pass them to MSC 108 and/or PSTN 124 and (b) receive circuit-switched communications from MSC 108 and/or PSTN 124, convert those to packet-based communications, and pass them to SPN 110.

VPN terminator 120 may be any entity arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least PDSN 112, Internet 114, media gateway 118, femtocell controller 122, and femtocell switch 126. In general, VPN terminator 120 establishes secure VPN connections over Internet 114 with femtocells such as femtocell 116, enabling the femtocells to securely communicate with devices on SPN 110 and perhaps beyond.

Femtocell controller 122 may be any entity arranged to carry out the femtocell-controller functions described herein, and may include a communication interface, a processor, and data storage comprising instructions executable by the processor for carrying out those femtocell-controller functions. The communication interface may include one or more wired and/or wireless interfaces for communicating with at least VPN terminator 120, along with perhaps one or more other entities on SPN 110, and beyond. Among other functions, femtocell controller 122 communicates via VPN terminator 120 with femtocells such as femtocell 116, and may receive requests from femtocells for configuration data, and those requests may include, among other values, indications of the femtocells' locations. Femtocell controller 122 may also operate to select various operational parameters for femtocells (e.g. carrier, PN offset, whether to broadcast a pilot beacon, contents of the pilot beacon, transmission-power level, etc.), and to transmit those parameters to femtocells, perhaps along with other configuration data and messaging.

Femtocell switch 126 may be any entity arranged to carry out the femtocell-switch functions described herein, and may include a communication interface, a processor, and data storage comprising instructions executable by the processor for carrying out those femtocell-switch functions. The communication interface may include one or more wired and/or wireless interfaces for communicating with at least MSC 108 and VPN terminator 120. In general, femtocell switch 126 acts as a switch between MSC 108 and VPN terminator 120, enabling mobile stations to communicate via femtocells over PSTN 124 via MSC 108.

b. Example Mobile Station

Figure 2:
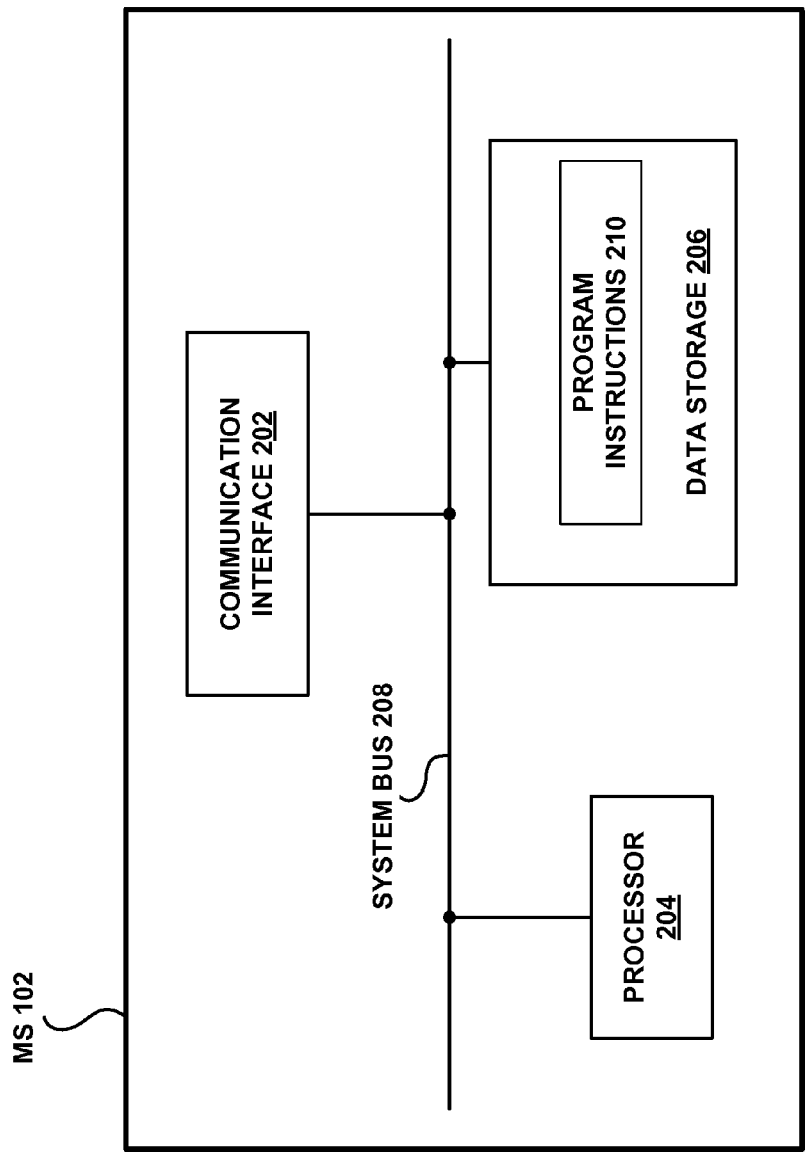
FIG. 2 depicts a mobile station, in accordance with at least one embodiment.

FIG. 2 depicts an exemplary diagram of mobile station 102, which includes a communication interface 202, a processor 204, and data storage 206, all communicatively linked by a system bus or other suitable mechanism 208. Note that mobile station 102 could have additional and/or different components, and that this structure is provided by way of example.

Communication interface 202 may include any combination of hardware (e.g. a dedicated antenna), software, and/or firmware for transmitting data to and receiving data from femtocells and/or macro BTSs, perhaps among other entities.

Processor 204 may comprise multiple (e.g. parallel) processors, such as a general-purpose microprocessor and/or a discrete digital-signal processor. The data storage 206 may take various forms, in one or more parts, such as a non-volatile storage block and/or a removable medium, and may contain program instructions 210 executable by processor 204 for carrying out the mobile-station functions described herein.

Thus, an example mobile station comprises at least one communication interface, at least one processor, and data storage containing instructions executable by the at least one processor to carry out functions including (i) receiving from a first base station an indication of a level of reverse noise being detected by a macro network, the indication having a value, (ii) selecting an initial-access-probe transmit power level based at least in part on the value of the received indication, and (iii) sending an initial access probe to a second base station at the selected initial-access-probe transmit power level.

2. Example Operation

Figure 3:
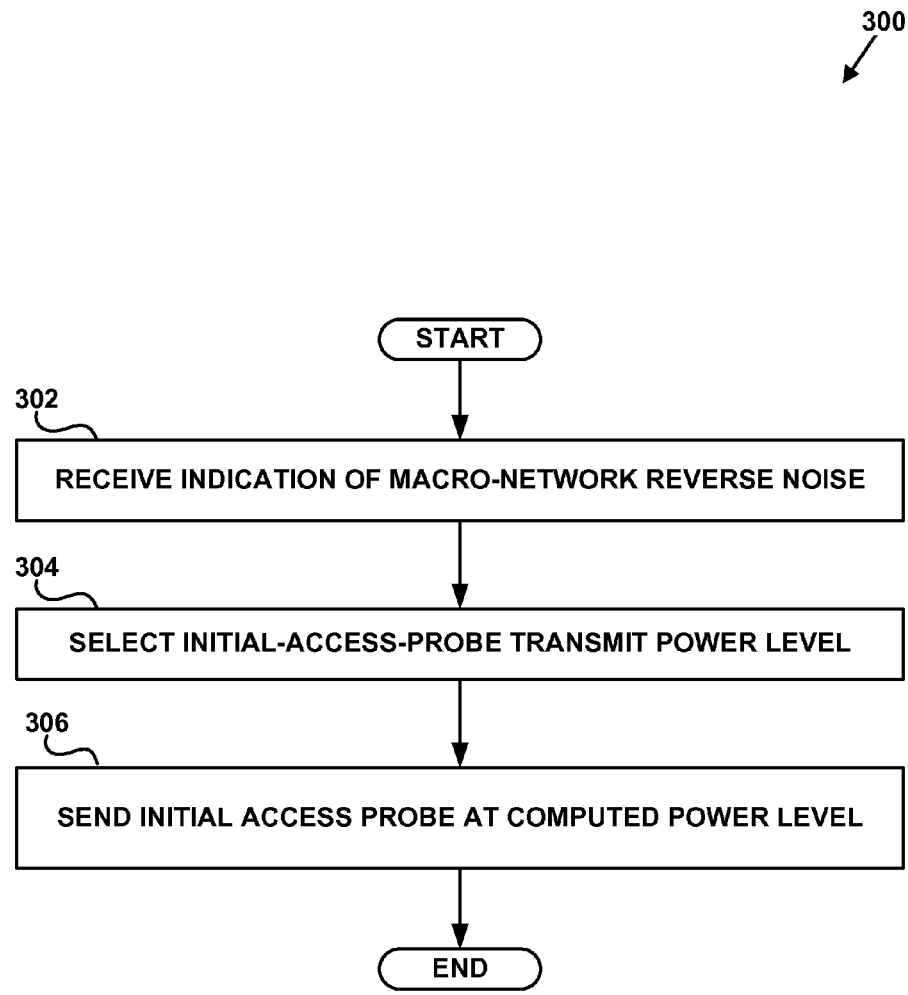
FIG. 3 depicts a method, in accordance with at least one embodiment.

FIG. 3 depicts a method 300, which may be carried out by a mobile station such as mobile station 102, or may be carried out by mobile station 102 in cooperation with one or more other entities. The arrangement of functions shown in FIG. 3 is an example and non-limiting. These functions could be re-ordered, combined, divided, or omitted, as appropriate for a particular implementation.

As shown in FIG. 3, method 300 begins at step 302, when mobile station 102 receives an indication of macro-network reverse noise. In some embodiments, the indication may be a macro-network-suggested initial-access-probe transmit power level or another power level. In other embodiments, the indication may be one or more RNRs, one or more RABs, or one or more RFERs. And other possibilities exist as well, including any combination of these. At step 304, mobile station 102 selects an initial-access-probe transmit power level.

Mobile station 102 bases its selection at least in part on the received indication of reverse noise. In an embodiment in which the indication is a power level, such as a macro-network suggested initial-access-probe transmit power level, the mobile station may select a transmit power level that is greater than or equal to the received power level. The selected initial-access-probe transmit power level may be computed by the mobile station, perhaps by adding an offset to an indicated power level. The offset may be a standard or preselected value. In other embodiments, the selection may involve accessing a look-up table that correlates particular RNR, RAB, RFER, and/or other reverse-noise-indicator value(s), or particular ranges of values, to certain initial-access-probe transmit power levels.

At step 306, mobile station 102 sends an initial access probe to femtocell 116 at the power level selected in step 304. Because this initial access probe is transmitted at the selected power level, the access probe is more likely to be successfully received by femtocell 116.

Thus, an example method comprises (i) a mobile station receiving from a first base station an indication of a level of reverse noise being detected by a macro network, the indication having a value, (ii) the mobile station selecting an initial-access-probe transmit power level based at least in part on the value of the received indication, and (iii) the mobile station sending an initial access probe to a second base station at the selected initial-access-probe transmit power level.

Further, the first base station may be a macro-network base station, and the second base station may be a femtocell. And the first and second base stations may both provide service on at least one common carrier frequency.

Still further, the received indication may comprise at least one value of RNR, the received indication may comprise at least one RAB, and the received indication may comprise at least one RFER. Moreover, the received indication may comprise a macro-network initial-access-probe transmit power level, and selecting the initial-access-probe transmit power level may comprise selecting the initial-access-probe transmit power level to be greater than the macro-network initial-access-probe transmit power level. And the received indication may comprise a power value, and selecting the initial-access-probe transmit power level may comprise adding an offset value to the power value.

3. Conclusion

Various exemplary embodiments have been described above. Those skilled in the art will understand, however, that changes and modifications may be made to those examples without departing from the scope of the claims.

We claim:
1. A method comprising:
    a mobile station receiving from a first base station an indication of a level of reverse noise being detected by a macro network, the indication having a value;
    the mobile station selecting an initial-access-probe transmit power level based at least in part on the value of the received indication; and
    the mobile station sending an initial access probe to a second base station at the selected initial-access-probe transmit power level.
2. The method of claim 1, wherein the first base station is a macro-network base station.
3. The method of claim 1, wherein the second base station is a femtocell.
4. The method of claim 1, wherein the received indication comprises at least one value of reverse noise rise (RNR).
5. The method of claim 1, wherein the received indication comprises at least one reverse activity bit (RAB).
6. The method of claim 1, wherein the received indication comprises at least one reverse frame error rate (RFER).
7. The method of claim 1, wherein the received indication comprises a macro-network initial-access-probe transmit power level.
8. The method of claim 7, wherein selecting the initial-access-probe transmit power level comprises selecting the initial-access-probe transmit power level to be greater than the macro-network initial-access-probe transmit power level.
9. The method of claim 1, wherein the received indication comprises a power value, and wherein selecting the initial-access-probe transmit power level comprises adding an offset value to the power value.
10. The method of claim 1, wherein the first and second base stations both provide service on at least one common carrier frequency.
11. A mobile station comprising:
    at least one communication interface;
    at least one processor; and
    data storage containing instructions executable by the at least one processor to carry out functions including (i) receiving from a first base station an indication of a level of reverse noise being detected by a macro network, the indication having a value; (ii) selecting an initial-access-probe transmit power level based at least in part on the value of the received indication; and (iii) sending an initial access probe to a second base station at the selected initial-access-probe transmit power level.
12. The mobile station of claim 11, wherein the first base station is a macro-network base station.
13. The mobile station of claim 11, wherein the second base station is a femtocell.
14. The mobile station of claim 11, wherein the received indication comprises at least one value of reverse noise rise (RNR).
15. The mobile station of claim 11, wherein the received indication comprises at least one reverse activity bit (RAB).

16. The mobile station of claim 11, wherein the received indication comprises at least one reverse frame error rate (RFER).

17. The mobile station of claim 11, wherein the received indication comprises a macro-network initial-access-probe transmit power level.

18. The mobile station of claim 17, wherein selecting the initial-access-probe transmit power level comprises selecting the initial-access-probe transmit power level to be greater than the macro-network initial-access-probe transmit power level.

19. The mobile station of claim 11, wherein the received indication comprises a power value, and wherein selecting the initial-access-probe transmit power level comprises adding an offset value to the power value.

20. The mobile station of claim 11, wherein the first and second base stations both provide service on at least one common carrier frequency.

\* \* \* \* \*